United States Patent
Chliwnyj et al.

[19]

[11] Patent Number: 5,946,159
[45] Date of Patent: Aug. 31, 1999

[54] SERVO EDGE CORRECTION USING EDGE SAMPLES TAKEN BY INDEPENDENTLY POSITIONED SERVO ELEMENTS

[75] Inventors: Alex Chliwnyj; Ronald Keith Rhodes; Colleen Renee Stouffer, all of Tucson, Ariz.

[73] Assignee: International Business Machines Corporation, Armonk, N.Y.

[21] Appl. No.: 08/757,421

[22] Filed: Nov. 27, 1996

[51] Int. Cl.[6] .................................................. G11B 5/584
[52] U.S. Cl. ....................................................... 360/77.12
[58] Field of Search .............................. 360/77.01, 77.02, 360/77.03, 77.05, 77.06, 77.07, 77.08, 77.04, 77.12, 77.13

[56] References Cited

U.S. PATENT DOCUMENTS

| | | | |
|---|---|---|---|
| 4,729,048 | 3/1988 | Imakoshi et al. | 360/103 |
| 5,185,681 | 2/1993 | Volz et al. | 360/77.05 |
| 5,448,430 | 9/1995 | Bailey et al. | 360/77.12 |
| 5,459,619 | 10/1995 | Colineau et al. | 360/47 |
| 5,483,394 | 1/1996 | Harman | 360/77.12 |
| 5,488,525 | 1/1996 | Adams et al. | 360/104 |

OTHER PUBLICATIONS

Jahnke, R. C., "Track–Locating and Following Apparatus for a Flexible Disk File", *IBM Technical Disclosure Bulletin*, vol. 23, No. 2, Jul. 1980, pp. 738–742.

"Median Selection of Position Error Signals in a Data Recording Disk File", *IBM Technical Disclosure Bulletin*, vol. 29, No. 12, May 1987, pp. 5239–5240.

*Primary Examiner*—Paul W. Huber
*Attorney, Agent, or Firm*—Gray Cary Ware Freidenrich

[57] ABSTRACT

Accurate tape servo track following is achieved by sampling servo edges at tape head alignments established with non-servo information, and processing the samples to (1) estimate optimal tape head index positioning to best align data as well as servo components, and (2) provide corrected position error signals (PESs) including a calculated error for comparison during ongoing servo track following to maintain the tape head at an optimal alignment for accurate alignment with the servo edges as well as data tracks on the tape.

45 Claims, 6 Drawing Sheets

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

SERVO EDGE CORRECTION USING EDGE SAMPLES TAKEN BY INDEPENDENTLY POSITIONED SERVO ELEMENTS

BACKGROUND OF THE INVENTION

1. Field of the Invention

The present invention concerns linear data storage devices with servo controlled head positioning. More particularly, the invention provides more accurate tape servo track following by sampling servo edges at nominal or "expected" tape head alignments established with non-servo information, and processing the samples to (1) identify optimal tape head index positions to best align data as well as servo counterparts and (2) provide corrected position error signals (PESs) for comparison during ongoing servo track following, to maintain the tape head at an optimal alignment for accurate alignment with the servo edges as well as data tracks on the tape.

2. Description of the Related Art

A data storage medium will often contain various servo signals to precisely position read/write heads with respect to tracks of data stored on the medium. A widespread example is found in magnetic tape systems, such as the IBM 3590. In IBM 3590 tape cartridges, the servo format pattern is often pre-written on the cartridge. The servo pattern includes three pairs of servo edges, each edge being a boundary between adjacent contrasting servo signals written on tape.

Nominally, the physical separation between paired servo edges is the same as the track pitch, e.g. 80 microns. The IBM model 3590 tape drive uses the locations of these servo edges to determine proper placement of written data tracks.

Drives such as the IBM model 3590 tape drive determine servo edge positions magnetically, by reading the pre-written servo patterns. Engineers have long recognized that, in most cases, servo track positioning is imperfect, and servo track pitch frequently differs slightly from the nominal track pitch of 80 microns. However, the present inventors have discovered that the variation in effective separation ("magnetic separation") between servo edges in some cases may be larger than previously thought. Physical separation between servo edges is primarily a function of the width of a physical write element of a write head used to initially lay down the servo pattern. Magnetic separation between servo edges, however, varies in response to other parameters, such as the relative amplitude of the two frequencies used to write the servo pattern. There is also an interaction between the servo read elements and the written pattern. This can cause some drives to perceive the spacing as being wider or narrower than nominal spacing.

As discovered by the present inventors, then, variability in magnetic separation between servo edges can exceed the variability in physical separation. Although servo systems in tape drives such as the IBM model 3590 amply compensate for most errors, small variations in the magnetic separation between adjacent servo edges can still permit data tracks to be written on tape with a D. C. error causing the data tracks to be squeezed together. The track mis-registration (TMR) will reduce the system read margins. In most cases, data is still written along tracks that can be easily read back by the tape head, and the data remains intact. However, in extreme cases, it is possible for a substantial error in written track placement to result in writing data with enough TMR to cause partial overwrite of an adjacent track, jeopardizing the integrity of data stored in the adjacent track. This is an especially troublesome problem in high density tape storage systems where adjacent data tracks have no intervening guard band.

SUMMARY OF THE INVENTION

Broadly, the invention provides more accurate tape servo track following by sampling servo edges at nominal or "measured" tape head alignments established with non-servo information, and processing the samples to (1) identify optimal tape head index positions to best align servo as well as data counterparts and (2) provide corrected position error signals (PESs) for comparison during ongoing servo track following, to maintain the tape head at an optimal alignment for accurate alignment with the servo edges as well as data tracks on the tape. The invention advantageously employs a non-servo position sensor (NPS) that utilizes mechanical and/or electrical components to position tape head with respect to the magnetic tape.

The samples of each servo element are averaged to generate a PES, indicative of any disparity between the servo element's position and the position of the sampled servo edge. For example, a PES may indicate a disparity of 2 microns between servo element position and a servo edge. A variety of different servo elements may be matched with different servo edges to provide a comprehensive assortment of servo samples.

In one embodiment, the PESs are interpreted to identify "measured" (or "perceived") servo edge positions, more accurately representing the actual locations of servo edges on the tape. The invention contemplates a number of different techniques for such interpretation. As one example, each servo element may be positioned to sample a lower and upper servo edge. Based on these samples, a corrected width of the servo pattern is determined. The corrected width corresponds to the distance between the lower and upper servo edges. Width estimates from other servo elements may also be generated, and all width estimates averaged to provide a final corrected width.

Based on the final corrected widths, corrected servo edge positions are calculated; these positions are used to determine corrected head index positions, which closely align the servo elements with the servo edges while maintaining acceptable alignment between data tracts and data read/write elements. When a data transfer operation is requested, the corrected head index positions are used by the NPS to initially index the tape head to a servo edge prior to servo track following on the tape.

Unlike prior arrangements, subsequent track following does not seek to minimize PESs to maintain alignment between servo elements and their corresponding servo edges. Such minimization would place the servo elements over the actual servo edge positions, which may be in error. Instead, optimal head position is achieved by positioning the servo elements to provide corrected PESs. Generally, the corrected PESs incorporate a calculated error to place the servo elements at the corrected servo edge positions, rather than actual positions of their corresponding servo edges. As a result, data tracks may be accurately read and written, despite errors in the perceived locations of servo edges.

One aspect of the invention involves a method to perform servo edge correction using edge samples taken by servo elements that are independently positioned, i.e., positioned using non-servo information. A different aspect of the invention involves a apparatus such as a tape storage subsystem, having components programmed to perform such servo edge correction using edge samples taken by independently positioned servo elements. Still another aspect of the invention involves an article of manufacture, such as a data storage medium, tangibly embodying a program of machine-readable instructions executable by a digital data processing apparatus to perform method steps to perform such servo edge correction using edge samples taken by independently positioned servo elements.

The present invention provides a number of distinct advantages. For example, the invention precisely compensates for substantial variations in magnetic separation between servo edges. The invention therefore helps avoid writing tracks of data at the wrong position, possibly overwriting previously stored data. Accordingly, the invention is especially useful in modern high density tape storage systems where adjacent data tracks have no intervening guard band and the servo pattern determines the track spacing.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Figure 1:
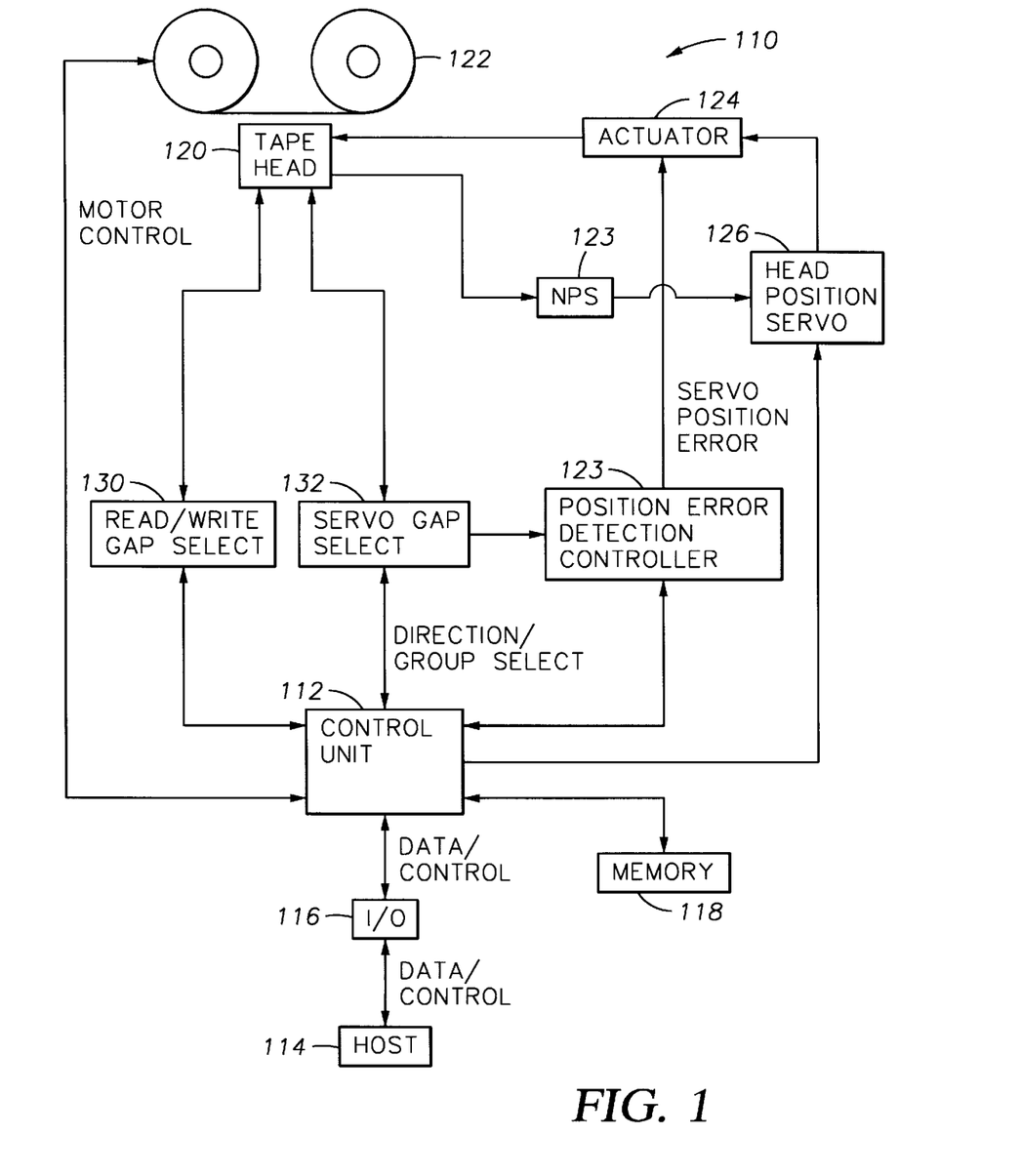
FIG. 1 is a diagram of the hardware components and interconnections of one embodiment of the invention.

One aspect of the invention concerns a tape storage system, which may be embodied a tape storage system 100 having hardware components and interconnections as described in FIG. 1. Broadly, the system 100 operates to read and write data from/to a magnetic tape 122 that contains servo information for transversely guiding a tape head 120. In the preferred embodiment, the system 100 includes features of the tape system of U.S. Pat. No. 5,448,430, entitled "Track Following Servo Demodulation", issued on Sept. 5, 1995 in the names of Bailey et al. The entirety of the '430 patent is incorporated herein by reference.

Control Unit

The system 100 includes a control unit 112 that exchanges data and control signals with a host 114 through an interface 116. The control unit 112 is interconnected to a memory device 118, such as random access memory ("RAM") to store various data such as tape head calibration information. The control unit 112 is also interconnected to tape reel motors and tachometers (not shown) to control the direction, velocity, and acceleration of the tape 122.

Position Error Controller

The system 100 also includes a position error controller 128 to direct a positioning actuator 124 during servo controlled track following. The actuator 124 may comprise, for example, a highly precise stepper motor. The position error controller 128 includes components for generating PESs. In the illustrated embodiment, a total of three PESs are generated at a time, one for each servo group. Each of the PESs indicates how well an active servo element is following a servo edge. A PES may provide a signal representing an offset, such as a value in microns, for example.

Depending upon the needs of the application, the position error detection controller 128 may generate PESs according to a new or a known technique. The generation of PESs, which is well known, is described in the following references: (1) U.S. Pat. No. 5,448,430, mentioned above, and (2) U.S. patent application Ser. No. 08/699,761, entitled "System and Method for Monitoring and Analyzing Tape Servo Performance", filed Aug. 20, 1996 in the names of Alex Chliwnyj et al. A discussion of the detection and mitigation of DC errors in PESs is found in U.S. patent application No. 08/406,277, entitled "Initialization and Calibration of Magnetic Tape Having Multiple Servo Areas", filed on Mar. 16, 1995 in the names of R. C. Baca, A. Chliwnyj, W. T. Comeaux, J. F. Crossland, and R. K. Rhodes. Each of the foregoing references is hereby incorporated herein by reference in its entirety.

Positioning Components

The system 100 also includes a number of different positioning components. First, the actuator 124 direct movement of the tape head 120 in a transverse direction relative to the tape width. A related component is the NPS 123, which provides a precise output signal representing the transverse position of the tape head 120 with respect to the tape 122. "Transverse" positioning refers to movement of the tape head 120 across the width of the tape 122, generally perpendicular to the longitudinal movement of the tape 122. The NPS 123 may include electrical, optical, mechanical components, and/or other suitable components. The sensor may comprise, for example, an optical tachometer adjacent the head 120, or another suitable sensor of micron-level accuracy. As one example, the NPS 123 may be embodied by an "independent position sensor" or "IPS" implemented in the IBM model 3590 tape drive, which is commercially available from IBM Corporation of Armonk, New York.

The NPS 123 provides its output signal to a head position servo 126. When the tape head 120 is to be moved to a selected index position, the control unit 112 activates the head position servo 126 to transmit an appropriate signal to the actuator 124. Signals from the NPS 123 provide feedback to the head position servo 126 to ensure satisfactory index positioning. In an exemplary embodiment, the head position servo 126 may be embodied by a digital signal processor, such as a Texas Instruments model TMS320C50.

Depending upon the needs of the application, the positioning components may include new, known, or a combination of new and known features. For example, these components may be constructed according to the disclosure of U.S. Pat. No. 5,448,430, mentioned above.

Unlike known servo systems, however, the head position servo 126 of the invention cooperates with the NPS 123 to sample servo edges on the tape and correct the detected servo edges using independent position information from the NPS 123. As a result, the present invention can precisely compensate for substantial variations in magnetic separation between servo edges, helping to avoid unintentionally overwriting pre-existing tracks of data. The operation of the system 100 in this respect is discussed in greater detail below.

Servo Pattern

Figure 2:
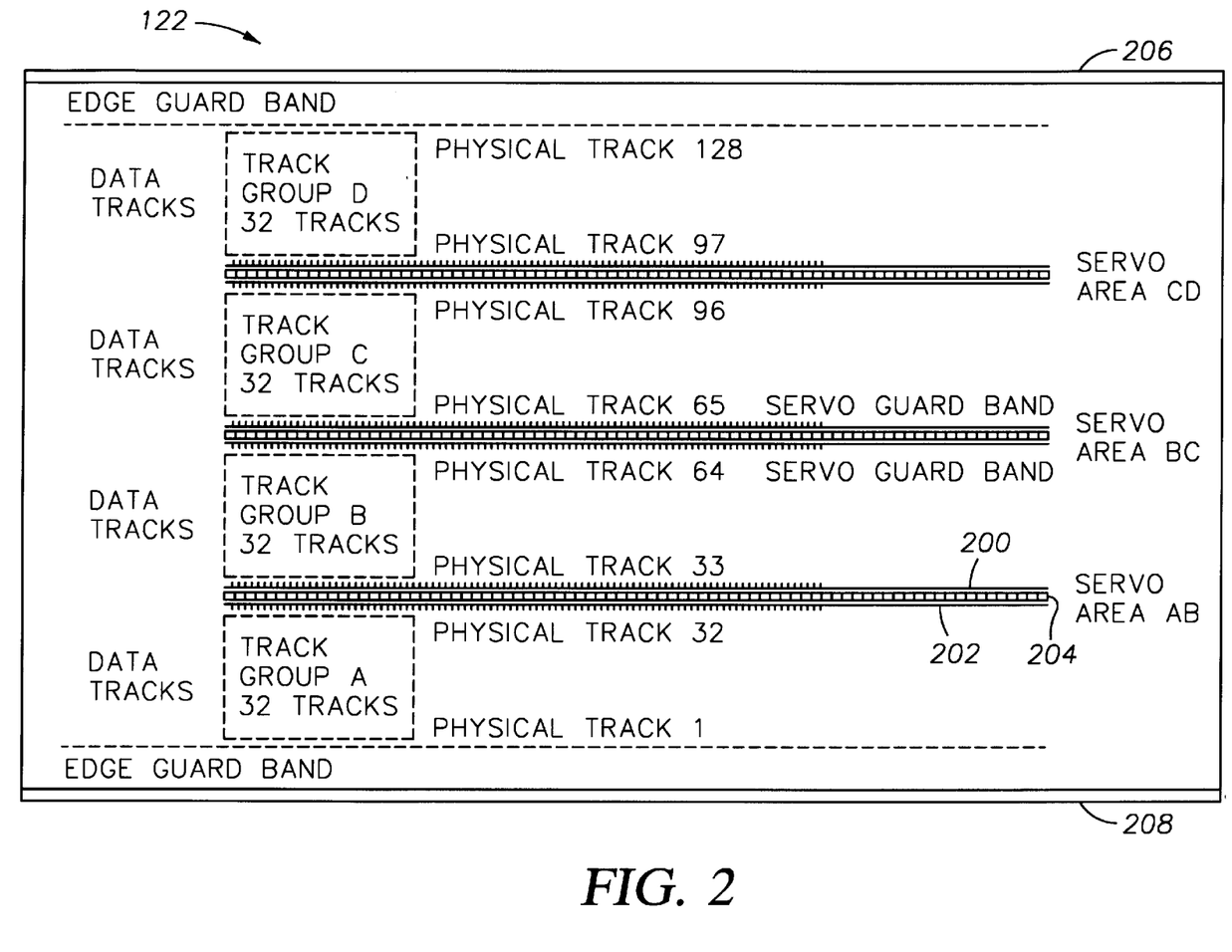
FIG. 2 is a diagram of a magnetic tape depicting parallel servo patterns according to one embodiment of the invention.

FIG. 2 illustrates the format of a magnetic tape 122 corresponding to the tape head 120. The tape 122 has four data track groups A, B, C, and D, having thirty-two parallel data tracks each. The tape 122 also has three parallel servo areas AB, BC, and CD symmetrically spaced across the tape width between the four data track groups A–D. The data track groups A–D and the servo areas AB, BC, and CD extend longitudinally the length of the tape 122. In some implementations, guard bands may be situated between the tape edges and the first and last data tracks, and between the boundaries of each servo area AB, BC, and CD and adjacent data tracks. Each servo area includes two outer tracks (e.g. 200, 202), having a recorded servo pattern of one frequency (called "F1"). Between each pair of outer tracks (e.g. 200/202) lies a middle track (e.g. 204) having a different recorded servo pattern of a second frequency (called "F2"). The two boundaries between F1 and F2 regions provide servo "edges".

As shown in FIG. 2, the tape 122 has an upper boundary 206 and a lower boundary 208.

Tape Head

The magnetic tape head 120 preferably comprises a thin-film magneto-resistive transducer. The head 120 includes data read/write elements to record and data to and read data from the tape 122. Preferably, the head 120 includes a plurality of transversely displaced data read/write elements to read from parallel tracks of an appropriate magnetic tape 122, such as a 128-track IBM model 3590 tape. The head 120 also includes multiple servo read elements ("servo elements") to read servo signals recorded on the tape 122.

Figure 3:
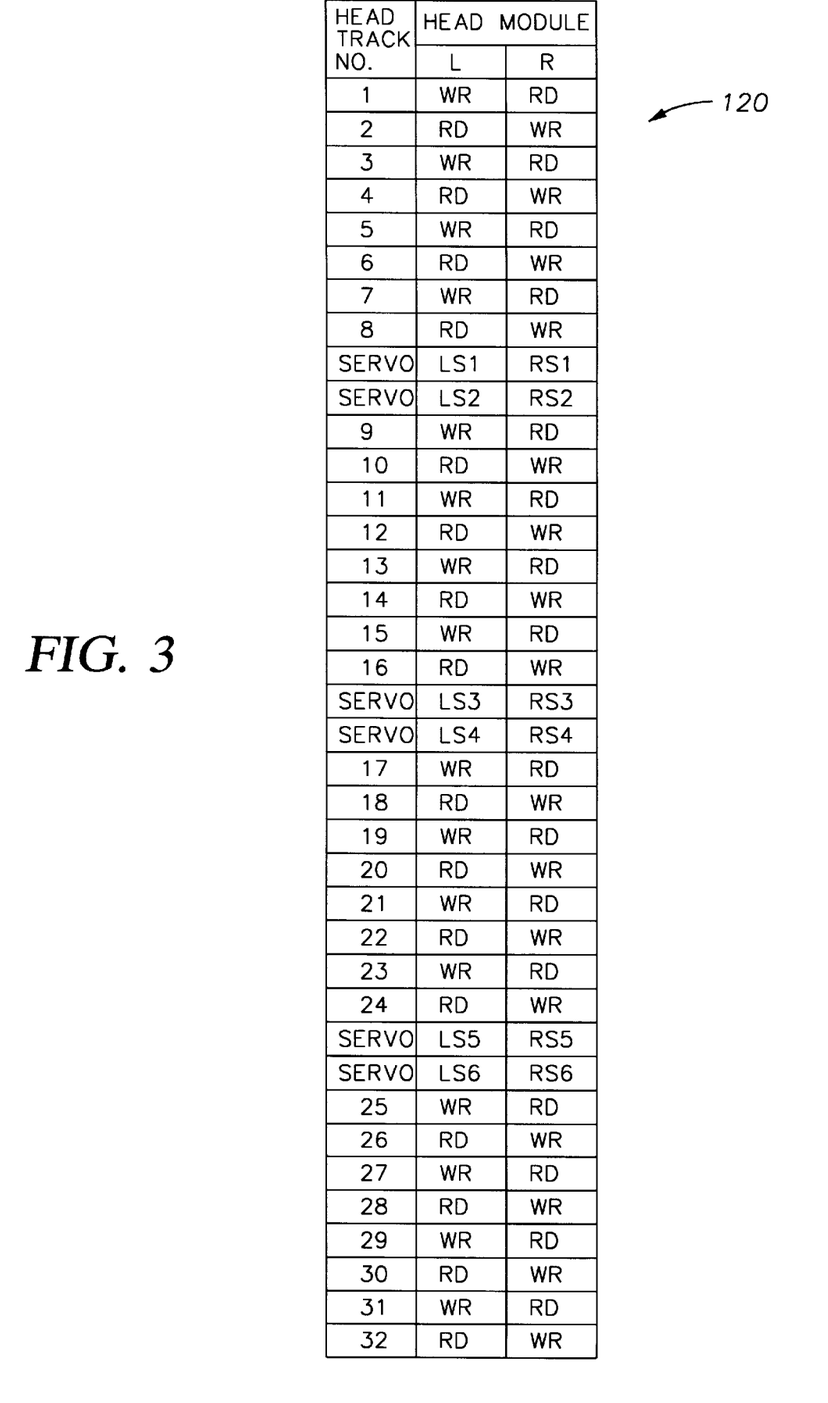
FIG. 3 is a diagram of a magnetic tape head in accordance with the invention.

In an illustrative embodiment, the tape head 120 may be constructed as shown in FIG. 3. The length of the tape head 120 substantially corresponds to the width of the tape 122. The tape head 120 includes thirty-two read/write element pairs (labelled "RD" and "WR") and three sets of servo read elements (e.g. LS1, RS6) corresponding to the three servo areas AB, BC and CD.

In the illustrated embodiment, the thirty-two parallel data track positions are divided into groups of eight, adjacent groups being separated two tracks occupied by a group of four servo elements. Each group of four servo elements may be referred to as a "servo group", e.g. LS1, RS1, LS2, and RS2. For further identification, servo elements pairs 1, 3, and 5 occupy upper positions, whereas pairs 2, 4, and occupy lower positions.

The tape head 120 includes left and right modules separately fabricated, then bonded together. Data write and read elements alternate transversely down the length of each module (i.e., across the width of the tape), beginning with a data write element in position on the left module and a data read element in the corresponding position on the right module. Thus, each data write element in the left module is paired with a data read element in the corresponding position on the right module and each data read element in the left module is paired with a data write element in the corresponding position on the right module such data that write/read element pairs alternate transversely with data read/write element pairs.

Figure 4:
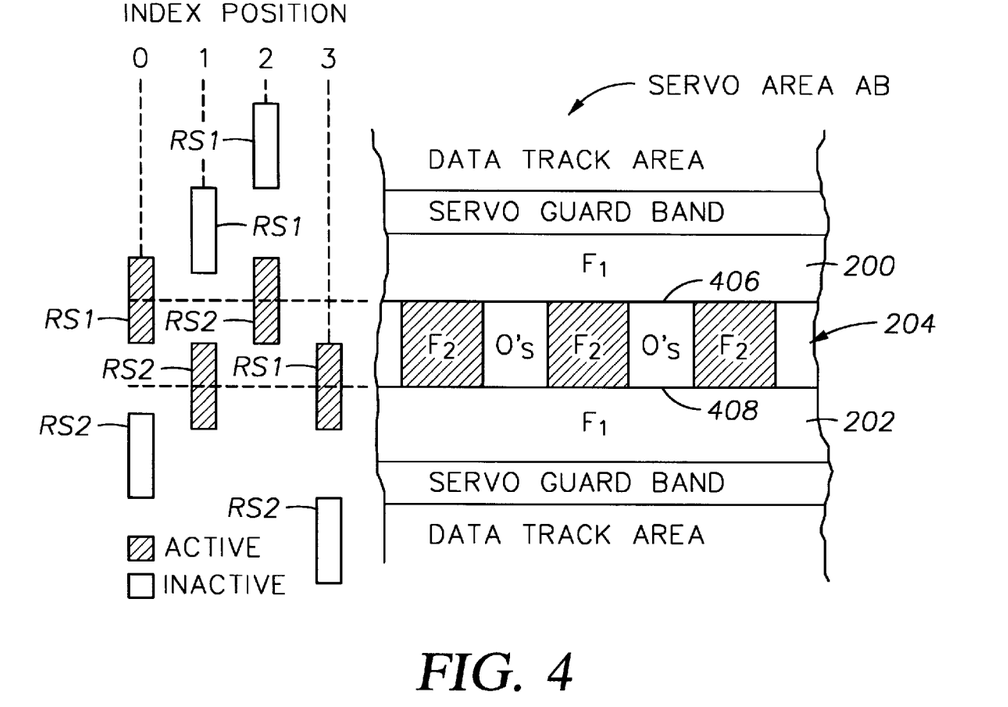
FIG. 4 is a diagram of an exemplary servo area of a magnetic tape head according to one embodiment of the invention.

FIG. 4 depicts the servo area AB in greater detail, along with various alignments between servo edges of the area AB and the servo elements RS1 and RS2 (FIG. 2). Nearby servo elements of the same group (i.e., LS1 and LS2) are not depicted, for clarity of illustration. The servo area AB includes two outer tracks 200 and 202, and a middle track 204 as discussed above. The junction of the tracks 200 and 204 defines a first or "upper" servo edge 406; likewise, the junction of the tracks 204 and 202 defines a second or "lower" servo edge 408 of the servo area AB.

Four index positions 0–3 are illustrated for the tape head 120. At index-0, the servo element RS1 is aligned with the servo edge 406. At index-1, the tape head 120 has been transversely shifted with respect to the tape 122 to align the servo element RS2 with the lower edge 408. At index-2, the servo element RS2 is aligned with the upper edge 406. At index-3, the servo element RS1 is aligned with the lower edge 408.

The four index positions 0–3 enable the thirty-two data read/write elements of the tape head 120 to access one-hundred-twenty-eight data tracks on the tape 122. As the tape 122 travels past the tape head 120 in one direction, the control unit 112 may direct the index controller 126 to position the transducer 120 in a first desired index position. The sixteen odd-numbered data read/write element pairs are enabled and access the following data tracks: 2nd, 10th, 18th, . . . , 114th, and 122nd. The tape direction is reversed for a second pass, the first index position is maintained, and the sixteen even-numbered data elements are enabled to access the following data tracks: 6th, 14th, 22nd, 118th, and 126th. For a third pass, the head is indexed to the next position, the tape moved forward, and the odd data elements are enabled to access the 3rd, 11th, 19th, . . . , 115th, and 123rd data tracks. The entire tape can be accessed in such a fashion, sixteen tracks at a time, with a total of four index positions and eight passes, four in each direction.

Operation

In addition to the various hardware embodiments described above, a different aspect of the invention concerns a method for more accurate servo track following. This method may be implemented, for example, by operating the head position servo 126 to execute a sequence of machine-readable instructions.

Data Storage Medium

These instructions may reside in various types of data storage medium. In this respect, one aspect of the present invention concerns an article of manufacture, comprising a data storage medium tangibly embodying a program of machine-readable instructions executable by a digital data processor to perform method steps to detect, correct, and follow servo edges using independent position information.

Figure 5:
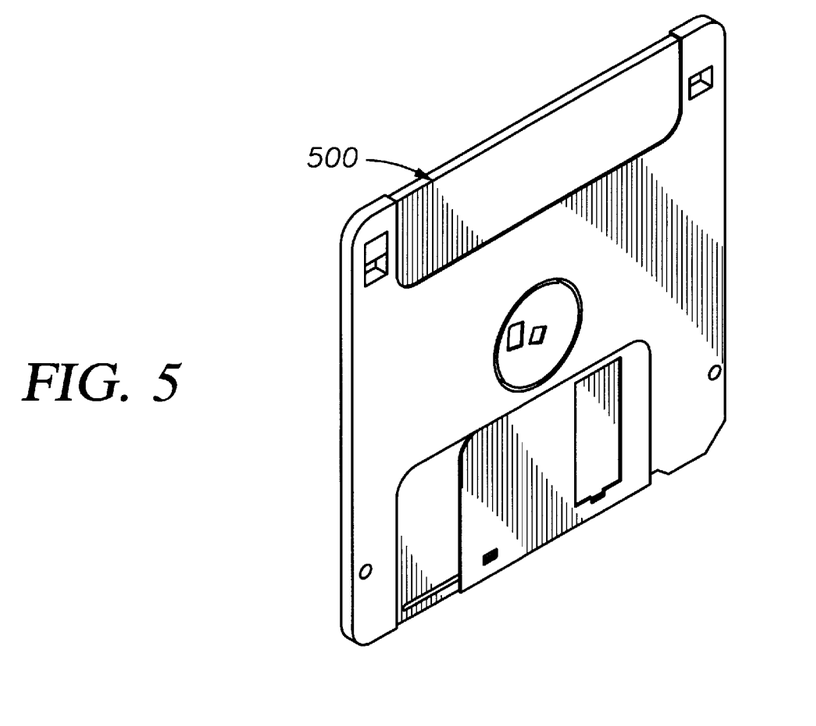
FIG. 5 is a perspective view of an illustrative article of manufacture pursuant to the invention.

This data storage medium may comprise, for example, volatile or non-volatile memory of the head position servo 126, for example. Alternatively, the instructions may be contained in another data storage medium, such as a magnetic data storage diskette 500 (FIG. 5). Whether contained in the head position servo 126 or elsewhere, the instructions may instead be stored on another type of data storage medium such as RAM, DASD storage (e.g. a conventional "hard drive" or a RAID array), magnetic tape, electronic read-only memory (e.g. ROM), optical storage device (e.g. WORM), paper "punch" cards, or other data storage media.

In the illustrated embodiment of the invention, where the machine-readable instructions reside in the head position servo 126, the machine-readable instructions may comprise lines of compiled TMS320C50 language assembly code.

Functional Overview

As discussed above, the invention generally facilitates accurate tape servo track following. Broadly, this is achieved by first sampling servo edges at nominal or "measured" tape head alignments established with non-servo information, and then processing the samples to (1) identify optimal tape head positions to best align data as well as servo counterparts, and (2) provide corrected position error signals (PESs) for use in track following to maintain the tape head at optimal alignment for accurate alignment with the servo edges as well as data tracks on the tape.

This is illustrated further with the following basic example, referencing a single servo edge and a single servo element (not shown). The tape head is first aligned with a nominal or "expected" location of a servo edge using the NPS. The servo edge's expected location is the track location at which the servo edge should have been initially laid down during manufacturing or formatting of the tape. After alignment, the tape is advanced past the tape head while the servo element is operated to take a plurality of samples of the servo edge. The samples are averaged and processed to create a measured (or "perceived") PES, which represents any offset between the servo edge's expected location and its actual location. Next, an optimal tape head index position is calculated, which will optimally align the servo element with the servo edge as well as the data track. In this example, if the servo edge is in error, the optimal index position will incorporate a small offset. In this example, with only one servo edge, the optimal index position would be the servo edge's expected position. A corrected PES is also computed. In particular, the corrected PES is calculated such that the servo element outputs the corrected PES when the tape head is tracking at the optimal index position.

Next, a user request is received to exchange data between the tape head and the tape. In response to the request, the following steps are performed. The NPS is first used to align the servo element with the optimal location of the servo track. The optimal location is used since alignment with the (possibly erroneous) measured location might misalign data read/write elements of the tape head with respect to data tracks on the tape. In particular, the data tracks may not exhibit the same positioning error as found in the servo tracks. Next, as the tape is advanced past the tape head, tape following is performed by regulating tape head position appropriately to ensure that the servo element outputs the corrected PES. This guarantees that the servo element is tracking over the optimal servo edge location.

As discussed in greater detail below, a more complicated technique is performed when multiple servo edges are used. PESs obtained by sampling each of the edges are analyzed and combined to yield an optimal index position, which ensures an optimal aggregate alignment between all servo elements and the corresponding servo edges, as well as desirable alignment of data elements and data tracks. Individual discrepancies between servo elements and their associated edges, however, may occur, since the variations of each edge's location are likely unique to that edge. Each combination of a servo element and a servo edge is analyzed to determine a corrected PES; when a servo element is positioned to output the corrected PES, the tape head is necessarily located at the optimal index position. Therefore, unlike prior techniques where a servo element is positioned to minimize its PES (i.e., to zero), servo elements according to the present invention are positioned to output the corrected PES, thereby guaranteeing alignment with the optimal index position.

The operational sequence of the present invention is discussed in greater detail below, with the aid of a more specific example.

Operational Sequence

Figure 6:
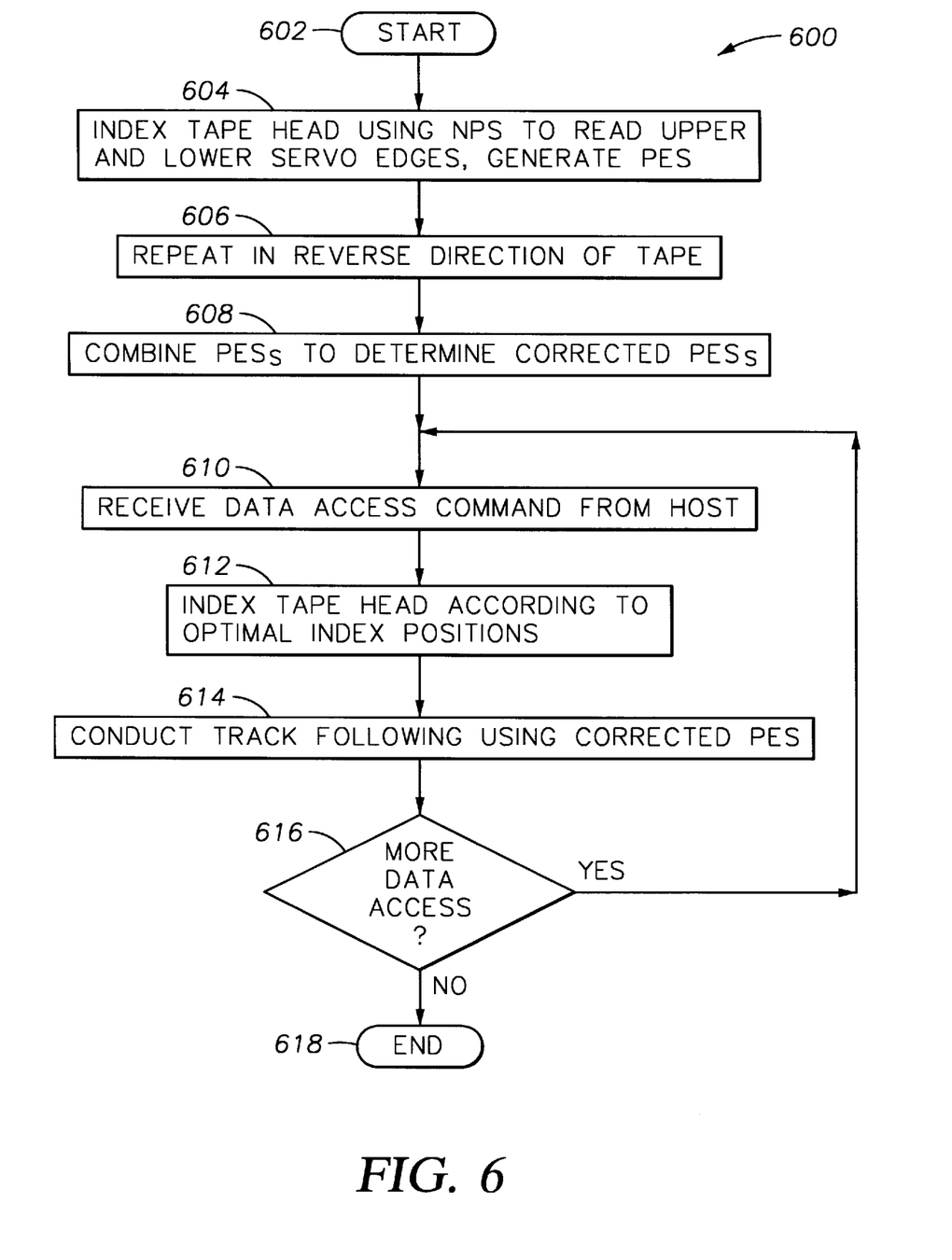
FIG. 6 is a flowchart illustrating an exemplary sequence of steps to perform more accurate tape servo track following using non-servo alignment information and servo edge sampling in accordance with the invention.

FIG. 6 shows a sequence of method steps 600 to illustrate one example of the method aspect of the present invention. For ease of explanation, but without any limitation intended thereby, the example of FIG. 6 is described in the context of the tape system 100 described above.

Reading Servo Edges

After the sequence 600 begins in task 602, the tape head 120 is indexed in task 604.

This indexing is achieved to sequentially pre-align each servo element from each servo group with both servo edges of the servo pattern correspond to that group. For instance, servo elements LS1, RS1, LS3, RS3, LS5, and RS5 may first be aligned with the upper and then the lower edges of the servo areas CD, BC, and AB, respectively (FIGS. 2–3). Then, the servo elements LS2, RS2, LS4, RS4, LS6, and RS6 may be aligned with the same upper and lower edges. Accordingly, a variety of servo edges and servo elements are matched to obtain a variety of servo edge samples.

The pre-alignment of task 604 aligns the servo elements with "expected" locations of the respective servo edges. The expected or "nominal" servo edge locations are those locations where servo edges were optimally laid down during manufacturing or formatting of the tape 122. However, as explained above, servo edges may exhibit variations between the expected or "nominal" locations where the servo edges were said to be placed, and where the servo edges are actually placed, i.e. their "actual" locations.

As mentioned above, the NPS 123 contains components for precisely positioning the tape head 120 with resolution on the micron level. Therefore, task 604 precisely positions the servo elements with respect to the corresponding servo edges' nominal locations.

Preferably, the reels are operated to continuously advance the tape. Thus, at each different indexing of the tape head, the tape 122 is being moved past the tape head 122. Concurrently, each pre-aligned servo element is operated to sense its corresponding servo edge, taking a plurality of samples of the servo edge. These output signals are averaged and further processed by the position error detection controller 128 to provide a corresponding PES. In the present disclosure, a positive (+) PES indicates that the actual servo edge is closer to the lower boundary 208 of the tape than the servo element (i.e., below); a negative (−) PES indicates that the actual servo edge is closer to the upper boundary 206 of the tape than the servo element (i.e., above).

After task 604, task 606 reverses the direction of tape movement, and repeats the same indexing and reading steps as discussed above. Steps involved in the generation of PESs are not discussed further, as many techniques for PES generation are already known, and the process as implemented in the present invention should be apparent to ordinarily skilled artisans having the benefit of this disclosure. For instance, tasks 604 and 606 may be performed in accordance with techniques explained in the '430 patent and '761 application, referenced above. As discussed in greater detail below, all PESs are ultimately combined (later) to determine the perceived (measured) position of the servo edges, for reasons discussed below. After task 606, all combinations of servo element and servo edge alignment have been preferably exhausted. Advantageously, this provides a comprehensive sampling of PESs, taking into account offsets due to module-to-module variations, azimuth effects, tape and formatting imperfections, and other the head-tape dynamics that may exist between different combinations of servo elements and servo edges.

Optimal Index Positions and Corrected PESs: Overview

After task 606, task 608 utilizes the resultant PESs to (1) identify optimal tape head index positions for the best concurrent alignment of data and servo elements with data and servo information on tape, and (2) identify corrected PESs incorporating a calculated error, which the servo elements seek to produce in order to precisely track-follow at optimal servo tracking positions.

Corrected Index Positions

As discussed above, the PESs were originally taken (tasks 604, 606) with the tape head 120 precisely indexed to an expected position on the tape 122, using the highly precise NPS 123. Accordingly, each PES represents the distance between the expected position of a servo edge and its actual location. Therefore, the PESs may be combined with the positions of expected alignment to estimate the actual edge positions. These are called the "perceived" (or "measured") edge locations. The perceived edge positions are processed to obtain an optimal tape head indexing, which concurrently provides advantageous alignment between (1) servo elements and servo tracks and (2) between data read/write elements and data tracks. When the tape head is moved to the optimal tape head indexing position, servo elements are aligned with corresponding optimal servo tracking positions. The determination of the optimal index position is discussed in greater detail below, with reference to the sequence 700 of FIG. 7.

Corrected PESs

Each corrected PES is a signal that incorporates a calculated error, such that a servo element's sustained production of the PES is calculated to align the servo element with the optimal servo tracking position. The corrected PES may be computed by changing the measured PES by a correction factor, the correction factor being the difference between the optimal index position and the measured servo position. This is discussed in greater detail below. Also as discussed below, task 608 may be performed in a number of different ways. An illustrative example is provided by the sequence 700 (FIG. 7), discussed in greater detail below.

Data Access Using Corrected Index Positions

After task 608, the optimal index positions and corrected PESs are available for indexing the tape head 120 and track following in future data access operations using the tape 120. Tape data access is triggered by receipt of a data access command from a source such as a host (task 610). In response to receipt of the data access command, the NPS 123 in task 612 utilizes the appropriate optimal index position to initially align the tape head to carry out the requested data transfer. As mentioned above, this alignment optimally aligns servo elements and data read/write elements with respective servo edges and data tracks.

After the indexing of 612 is completed, task 614 conducts track following using the corrected PES, to ensure that the servo elements closely follow the optimal servo tracking positions.

As long as query 616 identifies additional data access commands to process, tasks 612/614 are repeated. However, if a new tape is loaded, the steps 604–608 must be repeated to determine optimal tape head index positions and optimal servo tracking positions for the new tape. When no more data access requests exist, the routine 600 ends in task 618.

Determining Corrected PESs: One Embodiment

As mentioned above, the optimal servo tracking positions may be determined (task 608) in a number of ways. The following sequence 700 (FIG. 7) provides an illustrative example.

Figure 7:
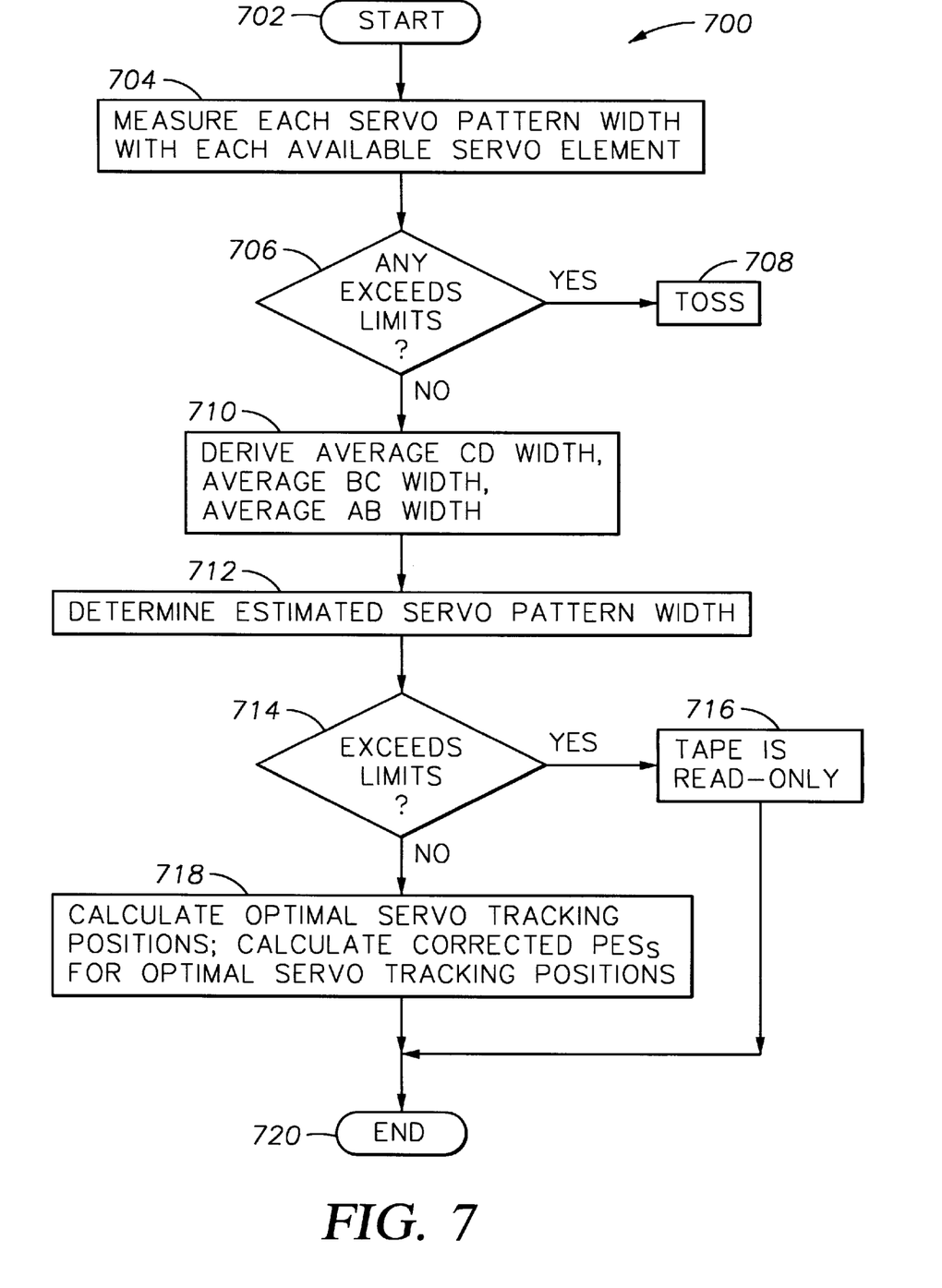
FIG. 7 is a flowchart illustrating an exemplary sequence of steps to determine corrected position error signals for optimal servo track following.

After the sequence begins in task 702, task 704 estimates the width of each servo pattern using each available servo element. The "available" servo elements for a servo pattern are those elements of the corresponding group of four elements, e.g., elements LS1, RS1, LS2, and RS2 for servo pattern CD. Each width estimate is preferably taken using a single servo element, eliminating element-to-element variations.

After task 704, query 706 determines whether any servo pattern width estimates exceed a predetermined limit, such as a difference of ±15 microns from the expected servo pattern width of 80 microns in the illustrated example. Such width estimates are thrown out in task 708. In this example, if any width estimate is less than 65 microns or greater than 95 microns, the estimate is thrown out in task 708.

After steps 706/708, task 710 derives average widths for each of the servo patterns CD, BC, and AB. This is performed by averaging each corresponding servo pattern width estimate (except for those thrown out). For instance, to determine the average CD pattern width, the following width estimates are averaged:
the LS1 estimate (forward tape movement),
the LS1 estimate (reverse tape movement),
the LS2 estimate (forward tape movement),
the LS2 estimate (reverse tape movement),
the RS1 estimate (forward tape movement),
the RS1 estimate (reverse tape movement),
the RS2 estimate (forward tape movement), and
the RS2 estimate (reverse tape movement).

Next, an estimated servo pattern width is computed in task 712, by averaging each of the previously calculated CD, BC, and AB estimates together. Then query 714 performs an error check. Namely, if the value of the estimated width error estimate exceeds certain limits, query 716 recognizes an apparently excessive error between expected and perceived servo pattern widths. In an illustrative embodiment, these limits may be +9 microns and less than −9 microns. Accordingly, if the estimated servo pattern width is outside the predetermined limits (e.g., greater than 89 microns or less than 71 microns), the tape 122 is deemed to be "read only" in task 716 to prevent overwriting existing data through the use of erroneous servo information. After task 716, the program 700 ends in task 720.

If the overall width estimate passes query 714, task 718 proceeds to optimal tracking and read index positions. In the present example, the optimal index positions are computed based on the estimated average servo width. Namely, each pair of optimal servo tracks (lower and upper) is assumed to be separated by the estimated average servo width, with the edges being evenly centered with respect tot their nominal ("expected") locations. Therefore, initial head indexing is conducted (task 612, FIG. 6) by using the NPS 123 to align the tape head 120 at the appropriate optimal index position. In this position, the servo elements track the optimal servo tracking locations. Under prior arrangements, the actual servo edge is followed by controlling the servo element to minimize its PES, i.e., to zero. However, as explained above, the actual servo edge positions may be substantially misplaced, possibly causing data read/write problems. Therefore, unlike prior arrangements, the present invention guides its servo elements (task 614, FIG. 6) to follow the optimal servo edge rather than the actual servo edge.

To track the optimal servo edge, the servo element is guided so that its PES provides the difference between the edge's estimated location and the optimal location, rather than being minimized to zero. Therefore, by positioning the servo elements to provide this calculated error, they are maintained over their optimal servo tracking positions. The computation of the corrected PES is performed in task 718. An example is shown in greater detail in Equation 1, below.

$$\text{corrected PES} = 0.5 * [\text{estimated servo width} - \text{optimal servo width}] \quad [1]$$

Accordingly, when a servo element provides the corrected PES, it is predicted to be displaced from the estimated servo edge position the required amount to accurately track at the optimal servo tracking position.

EXAMPLE

The following example is provided to illustrate the operation of the computation of corrected PESs in greater detail. In this example, the nominal servo pattern width is 80 microns. The estimated servo pattern width is 76 microns. The estimated width is acceptable because the difference (4 microns) does not exceed the maximum error threshold of 9 microns.

The corrected PES is determined as follows. Equation 1 is solved as shown in Equation 2, below.

$$\text{corrected PES} = 0.5 * [76 - 80] = -2 \text{ microns} \quad [1]$$

The measured servo edge separation is smaller than the desired track pitch. To apply the necessary correction to the top edge, it is necessary to servo lower, by using a corrected PES value of −2 microns. On the bottom edge, it is necessary to servo higher by the same amount. Accordingly, when a servo element provides a PES of −2 microns (indicating that the servo edge is 2 microns higher), the servo element is tracking on the optimal servo tracking position.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A data storage apparatus, comprising:

a magnetic tape head having multiple servo elements;

a non-servo position sensor (NPS) coupled to the tape head to provide positioning information for the tape head;

an actuator coupled to the tape head to position the tape head relative to a magnetic tape;

a position error detection controller to generate position error signals (PESs) each indicating a distance between a servo element and a servo edge on the magnetic tape;

a control unit coupled to the NPS, the actuator, and the position error detection controller, the control unit programmed to perform method steps for more accurate servo track following, comprising the steps of:

using a non-servo position sensor (NPS) to position a tape head with respect to a tape such that multiple first servo elements of the tape head are aligned with an expected location of a first servo track on the tape;

running the tape past the tape head while operating the first servo elements to create measured position error signals (PESs) representative of any offset between the first servo elements and an actual position of the servo track;

using the NPS to position the tape head with respect to a tape such that the first servo elements are aligned with an expected location of a second servo track on the tape;

running the tape past the tape head while operating the first servo elements to create a measured PES representative of any offset between the first servo elements and an actual position of the second servo track;

utilizing the measured PES to estimate locations of the first and second servo tracks;

determining a corrected first PES represented by a distance between the estimated location of the first servo track and the expected location of the first servo track, and a corrected second PES represented by a distance between the estimated location of the first servo track and the expected location of the second servo track;

utilizing the measured PES to estimate locations of the first and second servo tracks;

receiving a user request to exchange data with the tape, said data being accessible by indexing the first servo elements with the first servo track;

in response to the user request, performing steps comprising:

using the NPS to initially align the first servo elements with the expected location of the first servo track; and then running the tape past the tape head while regulating tape head position such that at least one of the first servo elements provides the corrected first PES.

2. The apparatus of claim 1, the non-servo position sensor comprising a mechanical position sensor.

3. The apparatus of claim 1, the non-servo position sensor comprising an optical position sensor.

4. The apparatus of claim 1, the non-servo position sensor comprising an opto-mechanical position sensor.

5. A data storage apparatus, comprising:

a magnetic tape head having multiple servo elements, said tape head being moveable in transverse position with respect to a magnetic tape having a servo pattern defined by first and second substantially parallel servo edges, said tape head including at least one servo element;

a non-servo position sensor (NPS) coupled to the tape head to provide a position signal indicative of transverse positioning of the tape head with respect to the magnetic tape;

an actuator coupled to the tape head to position the tape head relative to a magnetic tape;

a position error detection controller to generate position error signals (PESs) each indicating a distance between a servo element and a servo edge on the magnetic tape;

a control unit coupled to the NPS, the actuator, and the position error detection controller, the control unit programmed to perform steps comprising:

moving the tape head to a first transverse position indicated by the NPS, the first transverse position corresponding to an expected alignment between the first servo edge and a first servo group of at least one servo element;

for each servo element of the first servo group, running the magnetic tape past the tape head and operating the servo element to take a first plurality of samples of the first servo edge, and averaging the first plurality of samples to provide a first position error signal (PES) representing an average offset between the servo element and the first servo edge;

moving the tape head to a second transverse position indicated by the NPS, the second transverse position corresponding to an expected alignment between the second servo edge and the first servo group;

for each servo element of the first servo group, running the magnetic tape past the tape head and operating the servo element to take a first plurality of samples of the second servo edge, and averaging the first plurality of samples to provide a second PES representing an average offset between the servo element and the second servo edge;

moving the tape head to a third transverse position indicated by the NPS, the third transverse position corresponding to an expected alignment between the second servo edge and a second servo group of at least one servo element;

for each servo element of the second servo group, running the magnetic tape past the tape head and operating the servo element to take a third plurality of samples of the second servo edge, and averaging the third plurality of samples to provide a third PES representing any offset between the servo element and the second servo edge;

moving the tape head to a fourth transverse position indicated by the NPS, the fourth transverse position corresponding to an expected alignment between the first servo edge and the second servo group;

for each servo element of the second servo group, running the magnetic tape past the tape head and operating the servo element to take a fourth plurality of samples of the first servo edge, and averaging the fourth plurality of samples to provide a fourth PES representing any offset between the servo element and the first servo edge;

utilizing the PESs to estimate locations of the first and second servo edges;

determining a corrected first PES represented by a distance between the estimated location of the first servo track and the expected location of the first servo track, and a corrected second PES represented by a distance between the estimated location of the first servo track and the expected location of the second servo track;

receiving a user request to exchange data with the tape, said data being accessible by indexing the first servo group with the first servo track;

in response to the user request, performing steps comprising:

using the NPS to initially align the first servo group with the expected location of the first servo track; and then running the tape past the tape head while regulating tape head position such that at least one servo element of the first servo group provides the corrected first PES.

6. The apparatus of claim 5, the first servo group being one servo element.

7. The apparatus of claim 5, the second servo group being one servo element.

8. The apparatus of claim 5, the utilizing step comprising the steps of:

receiving an expected servo width representing spacing between the first and second transverse positions;

determining a preliminary first servo edge position by adjusting the first transverse position by an amount proportional to an average of the first and third PESs; and determining a preliminary second servo edge position by adjusting the first transverse position by an amount proportional to an average of the second and fourth PESs;

determining an actual servo width by determining spacing between the first and second preliminary servo edge positions;

determining a width difference between the expected servo width and the actual servo width;

if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

9. The apparatus of claim 5, the non-servo position sensor comprising a mechanical position sensor.

10. The apparatus of claim 5, the non-servo position sensor comprising an optical position sensor.

11. The apparatus of claim 5, the non-servo position sensor comprising an opto-mechanical position sensor.

12. A data storage apparatus, comprising:

a magnetic tape head having multiple servo elements, said tape head being moveable in transverse position with respect to a magnetic tape having multiple sets of substantially parallel servo patterns each defined by first and second substantially parallel servo edges, said tape head including multiple servo elements;

a non-servo position sensor (NPS) coupled to the tape head to provide a position signal indicative of transverse positioning of the tape head with respect to the magnetic tape;

an actuator coupled to the tape head to position the tape head relative to a magnetic tape;

a position error detection controller to generate position error signals (PESs) each indicating a distance between a servo element and a servo edge on the magnetic tape;

a control unit coupled to the NPS, the actuator, and the position error detection controller, the control unit programmed to perform steps comprising:

using a non-servo position sensor to transversely index a tape head to a first transverse position with respect to a magnetic tape, where a first group of servo elements are nominally aligned with expected locations of each first edge;

running the magnetic tape past the tape head and operating each nominally aligned servo element to take a plurality of samples of the corresponding servo edge, and averaging each plurality of samples to provide a position error signal (PES) representing an average offset between the respective servo element and the first servo edge;

using the non-servo position sensor to transversely index the tape head to a second transverse position with respect to a magnetic tape, where the first group of servo elements are nominally aligned with expected locations of each lower edge;

running the magnetic tape past the tape head and operating each nominally aligned servo element to take a plurality of samples of the corresponding servo edge, and averaging each plurality of samples to provide a PES representing an average offset between the respective servo element and the lower servo edge;

utilizing the PESs to determine (1) a modified first tape head index position concurrently providing a predetermined alignment between the first group of servo elements and each first edge and between data read/write elements of the tape head and corresponding data tracks on the tape, and (2) a modified lower tape head index position concurrently providing a predetermined alignment between the first group of servo elements and each lower edge and between data read/write elements of the tape head and corresponding data tracks on the tape;

for each servo element, determining a corrected first PES that said servo element would provide while the tape head is indexed at the modified first tape head index position, and a corrected lower PES that said servo element would provide while the tape head is indexed at the modified lower tape head index position;

receiving a user request to exchange data with the tape, said data being accessible by indexing the first servo group with the first servo edge;

in response to the user request., performing steps comprising:

using the NPS to initially align the first servo group with the expected location of the first servo edge; and then running the tape past the tape head while regulating tape head position such that at least one servo element of the first servo group provides the corrected first PES.

13. The apparatus of claim 12, the utilizing step comprising the steps of:

classifying each PES signal as bad if it exceeds a predetermined threshold; and utilizing each of the PESs, except those PESs classified as bad, to determine corrected first and second servo edge positions.

14. The apparatus of claim 12, the utilizing step comprising the steps of:

averaging the first plurality of PESs to form a first averaged PES;

determining the corrected upper servo edge position by adjusting the first transverse position by an amount proportional to the first averaged PES;

averaging the second plurality of PESs to form a second averaged PES; and determining the corrected lower servo edge position by adjusting the second transverse position by an amount proportional to the second averaged PES.

15. The apparatus of claim 12, the utilizing step comprising the steps of:

receiving an expected servo width representing spacing between the first and second transverse positions;

averaging the first plurality of PESs to form a first averaged PES;

averaging the second plurality of PESs to form a second averaged PES;

determining a preliminary first servo edge position by adjusting the first transverse position by an amount proportional to the first averaged PES; and determining a preliminary second servo edge position by adjusting the first transverse position by an amount proportional to the second averaged PES;

determining an actual servo width by determining spacing between the first and second preliminary servo edge positions;

determining a width difference between the expected servo width and the actual servo width;

if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

16. A method of more accurate servo track following, comprising the steps of:

using a non-servo position sensor (NPS) to position a tape head with respect to a tape such that multiple first servo elements of the tape head are aligned with an expected location of a first servo track on the tape;

running the tape past the tape head while operating the first servo elements to create measured position error signals (PESs) representative of any offset between the first servo elements and an actual position of the servo track;

using the NPS to position the tape head with respect to a tape such that the first servo elements are aligned with an expected location of a second servo track on the tape;

running the tape past the tape head while operating the first servo elements to create a measured PES representative of any offset between the first servo elements and an actual position of the second servo track;

utilizing the measured PES to estimate locations of the first and second servo tracks;

determining a corrected first PES representing a distance between the estimated location of the first servo track and the expected location of the first servo track, and a corrected second PES represented by a distance between the estimated location of the first servo track and the expected location of the second servo track;

utilizing the measured PES to estimate locations of the first and second servo tracks;

receiving a user request to exchange data with the tape, said data being accessible by indexing the first servo elements with the first servo track;

in response to the user request, performing steps comprising:

using the NPS to initially align the first servo elements with the expected location of the first servo track; and then running the tape past the tape head while regulating tape head position such that at least one of the first servo elements provides the corrected first PES.

17. The method of claim 16, the non-servo position sensor comprising a mechanical position sensor.

18. The method of claim 16, the non-servo position sensor comprising an optical position sensor.

19. The method of claim 16, the non-servo position sensor comprising an opto-mechanical position sensor.

20. A method for servo monitoring of a magnetic tape in a tape drive having a tape head moveable in transverse position with respect to the tape, said tape head including at least one servo element, said tape drive having a non-servo position sensor (NPS) providing a position signal indicative of transverse positioning of the tape head with respect to the magnetic tape, said tape including a servo pattern defined by first and second substantially parallel servo edges, said method comprising the steps of moving the tape head to a first transverse position indicated by the NPS, the first transverse position corresponding to an expected alignment between the first servo edge and a first servo group of at least one servo element;

for each servo element of the first servo group, running the magnetic tape past the tape head and operating the servo element to take a first plurality of samples of the first servo edge, and averaging the first plurality of samples to provide a first position error signal (PES) representing an average offset between the servo element and the first servo edge;

moving the tape head to a second transverse position indicated by the NPS, the second transverse position corresponding to an expected alignment between the second servo edge and the first servo group;

for each servo element of the first servo group, running the magnetic tape past the tape head and operating the servo element to take a first plurality of samples of the second servo edge, and averaging the first plurality of samples to provide a second PES representing an average offset between the servo element and the second servo edge;

moving the tape head to a third transverse position indicated by the NPS, the third transverse position corresponding to an expected alignment between the second servo edge and a second servo group of at least one servo element;

for each servo element of the second servo group, running the magnetic tape past the tape head and operating the servo element to take a third plurality of samples of the second servo edge, and averaging the third plurality of samples to provide a third PES representing any offset between the servo element and the second servo edge;

moving the tape head to a fourth transverse position indicated by the NPS, the fourth transverse position corresponding to an expected alignment between the first servo edge and the second servo group;

for each servo element of the second servo group, running the magnetic tape past the tape head and operating the servo element to take a fourth plurality of samples of the first servo edge, and averaging the fourth plurality of samples to provide a fourth PES representing any offset between the servo element and the first servo edge;

utilizing the PESs to estimate locations of the first and second servo edges;

determining a corrected first PES represented by a distance between the estimated location of the first servo track and the expected location of the first servo track, and a corrected second PES represented by a distance between the estimated location of the first servo track and the expected location of the second servo track;

receiving a user request to exchange data with the tape, said data being accessible by indexing the first servo group with the first servo track;

in response to the user request, performing steps comprising:

using the NPS to initially align the first servo group with the expected location of the first servo track; and then running the tape past the tape head while regulating tape head position such that at least one servo element of the first servo group provides the corrected first PES.

21. The method of claim 20, the first servo group being one servo element.

22. The method of claim 20, the second servo group being one servo element.

23. The method of claim 20, the utilizing step comprising the steps of:

receiving an expected servo width representing spacing between the first and second transverse positions;

determining a preliminary first servo edge position by adjusting the first transverse position by an amount proportional to an average of the first and third PESs; and determining a preliminary second servo edge position by adjusting the first transverse position by an amount proportional to an average of the second and fourth PESs;

determining an actual servo width by determining spacing between the first and second preliminary servo edge positions;

determining a width difference between the expected servo width and the actual servo width;

if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

24. The method of claim 20, the non-servo position sensor comprising a mechanical position sensor.

25. The method of claim 20, the non-servo position sensor comprising an optical position sensor.

26. The method of claim 20, the non-servo position sensor comprising an opto-mechanical position sensor.

27. A method for servo monitoring of a magnetic tape in a tape drive having a tape head moveable in transverse position with respect to the tape, said tape head including multiple servo elements, said tape drive having a non-servo position sensor (NPS) providing a position signal indicative of transverse positioning of the tape head with respect to the magnetic tape, said tape including multiple sets of substantially parallel servo patterns each defined by first and second substantially parallel servo edges, said method comprising the steps of:

using a non-servo position sensor to transversely index a tape head to a first transverse position with respect to a magnetic tape, where a first group of servo elements are nominally aligned with expected locations of each first edge;

running the magnetic tape past the tape head and operating each nominally aligned servo element to take a plurality of samples of the corresponding servo edge, and averaging each plurality of samples to provide a position error signal (PES) representing an average offset between the respective servo element and the first servo edge;

using the non-servo position sensor to transversely index the tape head to a second transverse position with respect to a magnetic tape, where the first group of servo elements are nominally aligned with expected locations of each lower edge;

running the magnetic tape past the tape head and operating each nominally aligned servo element to take a plurality of samples of the corresponding servo edge, and averaging each plurality of samples to provide a PES representing an average offset between the respective servo element and the lower servo edge;

utilizing the PESs to determine (1) a modified first tape head index position concurrently providing a predetermined alignment between the first group of servo elements and each first edge and between data read/write elements of the tape head and corresponding data tracks on the tape, and (2) a modified lower tape head index position concurrently providing a predetermined alignment between the first group of servo elements and each lower edge and between data read/write elements of the tape head and corresponding data tracks on the tape;

for each servo element, determining a corrected first PES that said servo element would provide while the tape head is indexed at the modified first tape head index position, and a corrected lower PES that said servo element would provide while the tape head is indexed at the modified lower tape head index position;

receiving a user request to exchange data with the tape, said data being accessible by indexing the first servo group with the first servo edge;

in response to the user request, performing steps comprising:
using the NPS to align the first servo group with the expected location of the first servo edge;
running the tape past the tape head while regulating tape head position such that at least one servo element of the first servo group provides the corrected first PES.

28. The method of claim 27, the utilizing step comprising the steps of:
classifying each PES signal as bad if it exceeds a predetermined threshold; and
utilizing each of the PESs, except those PESs classified as bad, to determine corrected first and second servo edge positions.

29. The method of claim 27, the utilizing step comprising the steps of:
averaging the first plurality of PESs to form a first averaged PES;
determining the corrected upper servo edge position by adjusting the first transverse position by an amount proportional to the first averaged PES;
averaging the second plurality of PESs to form a second averaged PES; and
determining the corrected lower servo edge position by adjusting the second transverse position by an amount proportional to the second averaged PES.

30. The method of claim 27, the utilizing step comprising the steps of:
receiving an expected servo width representing spacing between the first and second transverse positions;
averaging the first plurality of PESs to form a first averaged PES;
averaging the second plurality of PESs to form a second averaged PES;
determining a preliminary first servo edge position by adjusting the first transverse position by an amount proportional to the first averaged PES; and
determining a preliminary second servo edge position by adjusting the first transverse position by an amount proportional to the second averaged PES;
determining an actual servo width by determining spacing between the first and second preliminary servo edge positions;
determining a width difference between the expected servo width and the actual servo width, if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

31. An article of manufacture comprising a data storage medium tangibly embodying a program of machine-readable instructions executable by a digital processing apparatus to perform method steps for more accurate servo track following, said method steps comprising:
using a non-servo position sensor (NPS) to position a tape head with respect to a tape such that multiple first servo elements of the tape head are aligned with an expected location of a first servo track on the tape;
running the tape past the tape head while operating the first servo elements to create measured position error signals (PESs) representative of any offset between the first servo elements and an actual position of the servo track;
using the NPS to position the tape head with respect to a tape such that the first servo elements are aligned with an expected location of a second servo track on the tape;
running the tape past the tape head while operating the first servo elements to create a measured PES representative of any offset between the first servo elements and an actual position of the second servo track;
utilizing the measured PES to estimate locations of the first and second servo tracks;
determining a corrected first PES represented by a distance between the estimated location of the first servo track and the expected location of the first servo track, and a corrected second PES represented by a distance between the estimated location of the first servo track and the expected location of the second servo track;
utilizing the measured PES to estimate locations of the first and second servo tracks;
receiving a user request to exchange data with the tape, said data being accessible by indexing the first servo elements with the first servo track;
in response to the user request, performing steps comprising:
using the NPS to initially align the first servo elements with the expected location of the first servo track; and then
running the tape past the tape head while regulating tape head position such that at least one of the first servo elements provides the corrected first PES.

32. The article of manufacture of claim 31, the non-servo position sensor comprising a mechanical position sensor.

33. The article of manufacture of claim 31, the non-servo position sensor comprising an optical position sensor.

34. The article of manufacture of claim 31, the non-servo position sensor comprising an opto-mechanical position sensor.

35. An article of manufacture comprising a data storage medium tangibly embodying a program of machine-readable instructions executable by a digital processing apparatus to perform method steps for servo monitoring of a magnetic tape in a tape drive having a tape head moveable in transverse position with respect to the tape, said tape head including at least one servo element, said tape drive having a non-servo position sensor (NPS) providing a position signal indicative of transverse positioning of the tape head with respect to the magnetic tape, said tape including a servo pattern defined by first and second substantially parallel servo edges, said method steps comprising:

moving the tape head to a first transverse position indicated by the NPS, the first transverse position corresponding to an expected alignment between the first servo edge and a first servo group of at least one servo element;

for each servo element of the first servo group, running the magnetic tape past the tape head and operating the servo element to take a first plurality of samples of the first servo edge, and averaging the first plurality of samples to provide a first position error signal (PES) representing an average offset between the servo element and the first servo edge;

moving the tape head to a second transverse position indicated by the NPS, the second transverse position corresponding to an expected alignment between the second servo edge and the first servo group;

for each servo element of the first servo group, running the magnetic tape past the tape head and operating the servo element to take a first plurality of samples of the second servo edge, and averaging the first plurality of samples to provide a second PES representing an average offset between the servo element and the second servo edge;

moving the tape head to a third transverse position indicated by the NPS, the third transverse position corresponding to an expected alignment between the second servo edge and a second servo group of at least one servo element;

for each servo element of the second servo group, running the magnetic tape past the tape head and operating the servo element to take a third plurality of samples of the second servo edge, and averaging the third plurality of samples to provide a third PES representing any offset between the servo element and the second servo edge;

moving the tape head to a fourth transverse position indicated by the NPS, the fourth transverse position corresponding to an expected alignment between the first servo edge and the second servo group;

for each servo element of the second servo group, running the magnetic tape past the tape head and operating the servo element to take a fourth plurality of samples of the first servo edge, and averaging the fourth plurality of samples to provide a fourth PES representing any offset between the servo element and the first servo edge;

utilizing the PESs to estimate locations of the first and second servo edges;

determining a corrected first PES represented by a distance between the estimated location of the first servo track and the expected location of the first servo track, and a corrected second PES represented by a distance between the estimated location of the first servo track and the expected location of the second servo track;

receiving a user request to exchange data with the tape, said data being accessible by indexing the first servo group with the first servo track;

in response to the user request, performing steps comprising:

using the NPS to initially align the first servo group with the expected location of the first servo track; and then running the tape past the tape head while regulating tape head position such that at least one servo element of the first servo group provides the corrected first PES.

36. The article of manufacture of claim 35, the first servo group being one servo element.

37. The article of manufacture of claim 35, the second servo group being one servo element.

38. The article of manufacture of claim 35, the utilizing step comprising the steps of:

receiving an expected servo width representing spacing between the first and second transverse positions;

determining a preliminary first servo edge position by adjusting the first transverse position by an amount proportional to an average of the first and third PESs; and determining a preliminary second servo edge position by adjusting the first transverse position by an amount proportional to an average of the second and fourth PESs;

determining an actual servo width by determining spacing between the first and second preliminary servo edge positions;

determining a width difference between the expected servo width and the actual servo width;

if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

39. The article of manufacture of claim 35, the non-servo position sensor comprising a mechanical position sensor.

40. The article of manufacture of claim 35, the non-servo position sensor comprising an optical position sensor.

41. The article of manufacture of claim 35, the non-servo position sensor comprising an opto-mechanical position sensor.

42. An article of manufacture comprising a data storage medium tangibly embodying a program of machine-readable instructions executable by a digital processing apparatus to perform method steps for servo monitoring of a magnetic tape in a tape drive having a tape head moveable in transverse position with respect to the tape, said tape head including multiple servo elements, said tape drive having a non-servo position sensor (NPS) providing a position signal indicative of transverse positioning of the tape head with respect to the magnetic tape, said tape including multiple sets of substantially parallel servo patterns each defined by first and second substantially parallel servo edges, said method steps comprising:

using a non-servo position sensor to transversely index a tape head to a first transverse position with respect to a magnetic tape, where a first group of servo elements are nominally aligned with expected locations of each first edge;

running the magnetic tape past the tape head and operating each nominally aligned servo element to take a plurality of samples of the corresponding servo edge, and averaging each plurality of samples to provide a position error signal (PES) representing an average offset between the respective servo element and the first servo edge;

using the non-servo position sensor to transversely index the tape head to a second transverse position with respect to a magnetic tape, where the first group of servo elements are nominally aligned with expected locations of each lower edge;

running the magnetic tape past the tape head and operating each nominally aligned servo element to take a plurality of samples of the corresponding servo edge, and averaging each plurality of samples to provide a PES representing an average offset between the respective servo element and the lower servo edge;

utilizing the PESs to determine (1) a modified first tape head index position concurrently providing a predetermined alignment between the first group of servo elements and each first edge and between data read/write elements of the tape head and corresponding data tracks on the tape, and (2) a modified lower tape head index position concurrently providing a predetermined alignment between the first group of servo elements and each lower edge and between data read/write elements of the tape head and corresponding data tracks on the tape;

for each servo element, determining a corrected first PES that said servo element would provide while the tape head is indexed at the modified first tape head index position, and a corrected lower PES that said servo element would provide while the tape head is indexed at the modified lower tape head index position;

receiving a user request to exchange data with the tape, said data being accessible by indexing the first servo group with the first servo edge;

in response to the user request, performing steps comprising:

using the NPS to initially align the first servo group with the expected location of the first servo edge; and then running the tape past the tape head while regulating tape head position such that at least one servo element of the first servo group provides the corrected first PES.

43. The article of manufacture of claim 42, the utilizing step comprising the steps of:

classifying each PES signal as bad if it exceeds a predetermined threshold; and utilizing each of the PESs, except those PESs classified as bad, to determine corrected first and second servo edge positions.

44. The article of manufacture of claim 42, the utilizing step comprising the steps of:

averaging the first plurality of PESs to form a first averaged PES;

determining the corrected upper servo edge position by adjusting the first transverse position by an amount proportional to the first averaged PES;

averaging the second plurality of PESs to form a second averaged PES; and determining the corrected lower servo edge position by adjusting the second transverse position by an amount proportional to the second averaged PES.

45. The article of manufacture of claim 42, the utilizing step comprising the steps of:

receiving an expected servo width representing spacing between the first and second transverse positions;

averaging the first plurality of PESs to form a first averaged PES;

averaging the second plurality of PESs to form a second averaged PES;

determining a preliminary first servo edge position by adjusting the first transverse position by an amount proportional to the first averaged PES; and determining a preliminary second servo edge position by adjusting the first transverse position by an amount proportional to the second averaged PES;

determining an actual servo width by determining spacing between the first and second preliminary servo edge positions;

determining a width difference between the expected servo width and the actual servo width;

if the actual servo width exceeds the expected servo width, adjusting each preliminary servo edge position toward the other by an amount equal to half the width difference to form the first and second corrected servo edge positions; and if the expected servo width exceeds the actual servo width, adjusting each preliminary servo edge position away from the other by an amount equal to half the width difference to form the first and second corrected servo edge positions.

* * * * *